United States Patent [19]

Innes

[11] 4,074,332
[45] Feb. 14, 1978

[54] METHOD AND DIGITAL CIRCUIT FOR MEASURING SKEW OF MAGNETIC HEADS

[75] Inventor: Frank T. Innes, Chester, N.J.

[73] Assignee: Litton Business Systems, Inc., Morris Plains, N.J.

[21] Appl. No.: 690,710

[22] Filed: May 27, 1976

[51] Int. Cl.$^2$ .............................................. G11B 5/43
[52] U.S. Cl. ..................................... 360/137; 360/26
[58] Field of Search ..................... 360/137, 26, 31, 53, 360/109, 36

[56] References Cited

U.S. PATENT DOCUMENTS

| | | | |
|---|---|---|---|
| 3,142,829 | 7/1964 | Comstock | 360/53 |
| 3,196,419 | 7/1965 | Gabor | 360/26 |
| 3,456,237 | 7/1969 | Collins | 360/26 |
| 3,566,382 | 2/1971 | Niquette | 360/26 |

OTHER PUBLICATIONS

IBM Tech. Discl. Bull., vol. 15, No. 3, 8/72, "Programmed Skew Adjusting Procedure", Sorensen et al., p. 811.

*Primary Examiner*—Jay P. Lucas
*Attorney, Agent, or Firm*—Robert F. Rotella; Norman Friedman

[57] ABSTRACT

A digital circuit and method for measuring magnetic tape skew of magnetic tape units by recording on two channels of a reference tape a digital bit pattern of alternate pairs of zeros and ones.

Digital logic circuitry, which detects this information on a reference tape when read from a magnetic tape unit to be tested, feeds the digital information on one channel to a shift register which is sampled by a clocking signal derived from the other channel. The digital bit pattern indicated at the output stages of the shift register will identify the existance of any excessive lag or lead skew.

8 Claims, 2 Drawing Figures

METHOD AND DIGITAL CIRCUIT FOR MEASURING SKEW OF MAGNETIC HEADS

BACKGROUND OF THE INVENTION

In most computer use of magnetic tape, two or more tape date channels are read or sensed by timing signals derived from a timing channel or from timing information which is incorporated in the data channel or channels. In the ideal situation, the electromagnetic head gaps which are used to magnetize the tape are in a straight line and precisely oriented perpendicular to the direction of tape travel. Departures from perpendicularity are known as skew, statically measured as an angle, dynamically as a time displacement.

Skew becomes important when the skew angle at the time of writing is different from the angle at time of reading. The general case of this is when one attempts to read tapes on a magnetic tape mechanism other than the one on which it is written.

If the reference tape is recorded on a magnetic tape unit having zero skew (i.e. determined, for example, by some precise optical method) then the reference tape may be used as a master standard to adjust any similar tape unit for skew, thereby ensuring the interchangeability of all tapes recorded or played back on tape units so adjusted.

Where the reference tape is recorded on a magnetic tape unit of unknown skew (relative to a hypothetical or actual zero skew master) it may still be used to adjust similar units, but in this case interchangeability can only be ensured within the limited class of units so adjusted.

SUMMARY OF THE INVENTION

It is, therefore, an object of this invention to provide a simple circuit and method for determining the presence or absence of skew in a magnetic tape unit.

Another object of this invention is to provide an improved skew detection circuit which can quickly test magnetic tape units for skew.

A further object of this invention is to provide a method of quickly testing the compatibility of magnetic tape units with a reference test tape.

An additional object of this invention is to provide a circuit which can be used to adjust magnetic tape units which have excessive skew.

These and other objects of the present invention are accomplished in the illustrative embodiment by providing a digital circuit and method for measuring magnetic tape skew of magnetic tape units by first recording, on two channels of a reference magnetic tape, a digital bit pattern of alternate pairs of zeros and ones. The digital logic measuring circuit, when coupled to the magnetic tape unit to be tested with the reference tape, feeds the information sensed in the first channel to a shift register, which information is sampled by a clocking signal derived from the second channel. When there is zero skew error, the clocking signal will sample the digital information of the first channel in the center of each bit cell, thereby providing a shift register output indicating 0101 or 1010. In the case of excessive lag or lead skew, the clocking signal will be displaced in time depending on the degree of lead or lag skew, resulting in sampling away from the center of each bit cell and when this skew is lagging excessively, the O's on the first channel will be read as indicating 1's while the 1's on the first channel will continue to be read as indicating 1's, and vice versa in the case of excessive lead skew. In the case of excessive lag skew and excessive lead skew, respectively, the output stages of the shift register will provide an output indication of 0000 and 1111. Coupling each output stage of the shift register to logic circuitry will identify whether there is any excessive skew.

DETAILED DESCRIPTION OF THE INVENTION

Figure 1:
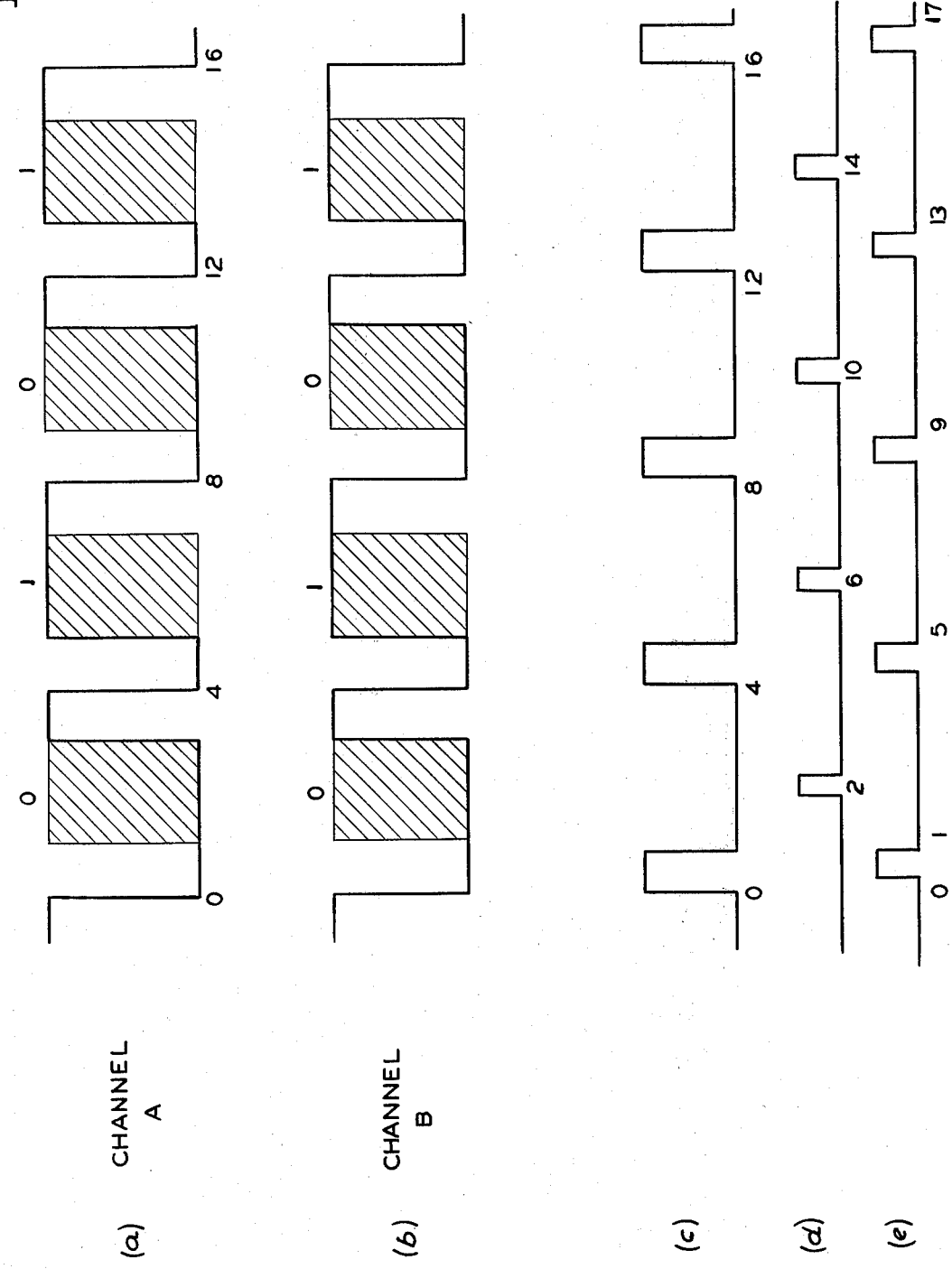
FIG. 1 is a series of waveforms useful in understanding the operation of the embodiment of FIG. 2.

Referring to FIG. 1 wherein a plurality of waveforms are shown, a standard cassette-type magnetic tape is recorded two bits at a time, on two channels, A and B, as represented by curves "(a)" and "(b)" of FIG. 1, to function as a reference or test tape. Such test tape is conventionally recorded by a magnetic tape unit (not shown) which has been set to skew equal to zero by some other technique than the present invention. Continuously written thereon, in each channel A and B, are data in digital form, alternate pairs of zeros and ones. As represented by curves "(a)" and "(b)", FIG. 1, the digital bit pattern 010101... is recorded on each of the two channels. In the preferred embodiment each bit cell is four milliseconds long, and each bit of data is recorded for a two millisecond period in the middle of each bit cell. The downward transitions of the data on the A channel are used to generate timing signals, represented by curve "(d)", FIG. 1, which ideally test the two-millisecond data areas, the areas cross-hatched in curve "(a)" and "(b)", FIG. 1, at their centers. If there is any skew present and no other type of error, the digital data on channel B will sample earlier or later than the corresponding data on channel A.

Figure 2:
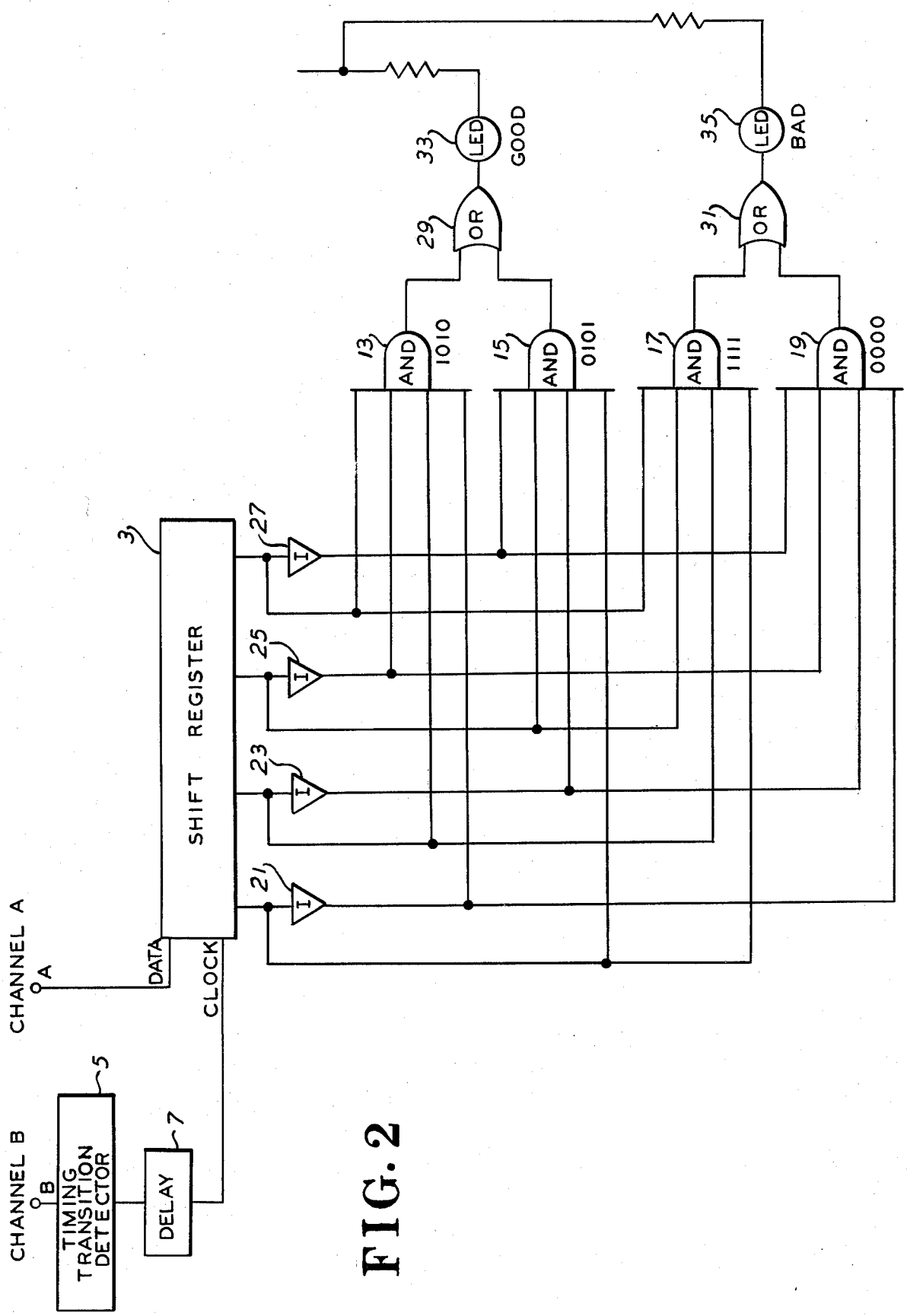
FIG. 2 is a simplified functional block diagram of the skew measuring circuit incorporating the features of this invention.

Referring now also to FIG. 2 the logic circuitry for implementing the instant invention is illustrated. The digital information represented on channel A of the magnetic tape is sensed, by conventional magnetic reading means (not shown), and the resulting output signals are coupled over line A to the input of a four stage orbit serial input parallel output shift register 3. Similarly the recorded digital information on channel B is sensed and coupled over line B to a conventional detection circuit 5, such as a differentiator circuit or one-shot flip-flop circuit, which is utilized to detect only the negative going transition of the digital data represented by curve "(b)", FIG. 1. The detected pulses are represented in curve "(c)", FIG. 1. The output of said detection circuit 5 is then coupled to the input of a delay means 7, such as another one-shot flip-flop circuit or a counter circuit, to delay said detected pulses so that they occur at the center of each bit cell, and therefore at the center of the information portion of said bit cells. These delayed pulses, are used to sample or clock, the channel A digital information into the shift register 3. Each of the four output stages of the shift register 3 are directly coupled to one input of a four input AND circuit 13, 15, 17, and 19 thereby providing a "true" input to said AND inputs. Also each of said four output stages of said shift register 3 are coupled to four inverter circuits 21, 23, 25, 27, which inverts any signal present at its input, namely the signal present at the four output stages of said shift register 3 thereby providing a "complement" signal at their inverter circuits output. The true output from the first, second, third, and fourth stages are coupled, respectively to one input of the second and third AND circuit 15 and 17, one input of the first and third AND circuit 13 and 17, one input of the second and third AND circuit 15 and 17, and one input of the first and third AND circuit 13 and 17. The complement output from the first four inverter circuits 21, 23, 25, and 27, are coupled respectively, to one input of the first and fourth AND circuit 13 and 19, to one input of the first and fourth AND circuit 13 and 19, and to one input of the second and fourth AND circuits 15 and 19. The outputs of the first two AND circuits 13 and 15, and the second two AND circuits 17 and 19, are coupled, respectively, to the inputs of two OR circuits, 29 and 31. Each of said OR circuits 29 and 31 has its output coupled to an indicator means, and in the preferred embodiment a green and red light emitting diode, 33 and 35 respectively.

In operation, referring now to both FIG. 1 and FIG. 2, in the case where there is error-free operation, zero skew, both channel A and B will have the same digital test data in time coincidence with one another. This will mean that the input data clocked into the shift register 3 will indicate a 0101 digital bit pattern, or 1010 depending on the time of sampling. This will result in the shift register 3 having an output indication, from the first to fourth stage, of 1010 or 0101, respectively. The inputs to the first two AND circuits 13 and 15, will all indicate 0000 and 1111, thereby providing a 1 output indication at the output of one of the AND circuits 13 and 15 which has the 1111 input. Thus one of the input lines of OR circuit 29 will indicate a 1 and pass it through the OR circuit 29 to activate the green diode 33, so long as the signal to the input of said flip-flop 9 remains the same, thereby indicating not excessive skew in the tested machine. The inputs to the other two AND circuits 17 and 19 would indicate 0101 and 1010, which would result in the absence of any output signal at both of these AND circuits 17 and 19 indicating a 1. Accordingly no signal would pass through the OR circuit 31 indicating a 1 and hence the red diode 35 would remain unlit.

Thus in the case of error-free operation, the contents of the first four stages of the shift register 3 will always be either 0101 or 1010. However, where there is excessive lag shew in the machine, the 1's on channel A will be read as indicating 0's, while the 0's on channel A will continue to be read as indicating 0's. This may be best understood by referring to curves "(a)" and "(e)", FIG. 1, the latter curve representing the clocking or sampling pulses to the shift register 3 in the case where there is an excessive skew lag. In the case of excessive lead skew the 0's on channel A will be read as indicating 1's, while the 1's on channel A will continue to be read as indicating 1's.

In the case of excessive lag skew, the output stages of the shift register 3 will provide an output indication of 0000; excessive lead skew will provide an output indication of 1111. Accordingly in either the lag or lead case, neither AND circuit 13 or 16 will indicate a 1 on its output line as their inputs will indicate 0101 or 1010. However, in both lead and lag cases the output line of one of the AND circuits 17 and 19 will indicate a 1 as one of the AND circuits 17 or 19 will have an input indication of 1111. Thus one of the OR circuits 31 input lines will indicate a 1 and pass it through to activate the red diode 35, thereby indicating excessive lead or lag skew in the machine tested. Although the preferred embodiment shows the lag and lead skew AND circuits combined together in one OR circuit 31, separate OR circuits coupled to the output of each AND circuit could be utilized so as to indicate the particular condition, be it lag or lead.

Instead of utilizing a predetermined delay time, the delay means 7 could be varied so as to provide a variable delay thereby actually measuring the amount of any skew present in the tested magnetic unit.

Obviously many modifications and variations of the present invention are possible in light of the above teachings. It is therefore, to be understood that within the scope of the appended claims the invention may be practiced otherwise than as specifically described.

What is claimed is:

1. A magnetic tape skew measuring circuit comprising:
   a shift register means having at least two stages;
   at least two AND cirucits, each coupled at its input to the output of said at least two stages of said shift register means;
   an OR circuit means whose inputs are coupled to the output of only two of said AND circuits;
   the outputs of each of said stages of said shift register means being coupled to each of said at least two AND circuits; and
   first transmission means, coupled to the output of each stage of said shift register, for coupling the true and complement output signals from the second and first stages, respectively, to each of said AND circuits.

2. A magnetic tape skew measuring circuit according to claim 1 further comprising;
   an OR circuit means whose inputs are coupled to the outputs of said AND circuit.

3. A magnetic tape skew measuring circuit according to claim 2 wherein said shift register includes at least four output stages, and wherein the said first transmission means alternately couples the true and complement output signals from each of said four output stages to said first and second AND circuits.

4. A magnetic tape skew measuring circuit according to claim 3 wherein at least three AND circuits are included,
   and further comprising a second transmission means coupled to the output of each stage of said shift register for coupling the same type output signal from each stage to said third AND circuit.

5. A magnetic tape skew measuring circuit according to claim 4 wherein at least four AND circuits are included, and wherein said second transmission means couples the true and complement output signal from each of said stages of said shift register to the input of said third and fourth AND circuit respectively.

6. A magnetic tape skew measuring circuit according to claim 5 further including a plurality of output indicator means, coupled to the output of each of said third and fourth AND circuits and to the output of said OR circuit means.

7. A magnetic tape skew measuring circuit according to claim 6 wherein said output indicator means includes, a plurality of indicator lamps coupled to said outputs of said AND circuits.

8. The method of measuring magnetic tape skew of a magnetic tape unit, comprising the steps of:
   recording on two channels of a reference magnetic tape a continuous digital bit pattern of alternate pairs of zeros and ones;

detecting said information in said reference magnetic tape unit;

feeding the detected digital information on one channel to a shift register means having at least two stages which is clocked by signals derived from the information detected from said other channel, coupling the output of said at least two stages of said shift register means to the input of at least two AND circuits, coupling the output of only two of said AND circuits to the inputs of an OR circuit means, coupling the outputs of each of said stages of said shift register means to each of said at least two AND circuits, and coupling the true and complement output signals from said shift register second and first stages, respectively, to each of said AND circuits by means of first transmission means coupled to the output of each stage of said shift register.

* * * * *